(12) United States Patent
Abrahamson

(10) Patent No.: US 8,964,369 B2
(45) Date of Patent: Feb. 24, 2015

(54) SOLID-STATE MASS DATA STORAGE DEVICE

(75) Inventor: Todd W. Abrahamson, Woodbury, MN (US)

(73) Assignee: Imation Corp., St. Paul, MN (US)

( * ) Notice: Subject to any disclaimer, the term of this patent is extended or adjusted under 35 U.S.C. 154(b) by 135 days.

(21) Appl. No.: 13/014,410

(22) Filed: Jan. 26, 2011

(65) Prior Publication Data

US 2011/0182025 A1 Jul. 28, 2011

Related U.S. Application Data

(60) Provisional application No. 61/298,481, filed on Jan. 26, 2010.

(51) Int. Cl.
*G06F 1/16* (2006.01)
*G06F 1/18* (2006.01)

(52) U.S. Cl.
CPC ..................................... *G06F 1/187* (2013.01)
USPC ............ 361/679.33; 361/679.31; 361/679.32; 361/724; 361/725; 361/726; 438/106; 438/107; 438/108; 438/109; 438/110

(58) Field of Classification Search
USPC ..................................................... 361/72–727
See application file for complete search history.

(56) References Cited

U.S. PATENT DOCUMENTS

| | | | | |
|---|---|---|---|---|
| 5,499,164 | A * | 3/1996 | Hill-Lindsay et al. | 361/785 |
| 6,172,875 | B1 * | 1/2001 | Suzuki et al. | 361/729 |
| 7,978,476 | B2 * | 7/2011 | Heard et al. | 361/752 |
| 8,134,875 | B2 * | 3/2012 | Baxter | 365/189.2 |
| 2008/0259575 | A1 * | 10/2008 | Tanimura et al. | 361/749 |
| 2009/0063895 | A1 * | 3/2009 | Smith | 714/7 |
| 2009/0080152 | A1 * | 3/2009 | Conn | 361/679.53 |
| 2009/0094406 | A1 * | 4/2009 | Ashwood | 711/103 |
| 2011/0019370 | A1 * | 1/2011 | Koh | 361/749 |

* cited by examiner

*Primary Examiner* — Jayprakash N Gandhi
*Assistant Examiner* — Mukund G Patel
(74) *Attorney, Agent, or Firm* — Winthrop & Weinstine, P.A.

(57) ABSTRACT

In an example, a solid-state data storage system comprises a housing forming an enclosure; a plurality of trays within the enclosure of the housing; a plurality of non-volatile, rewriteable solid-state memory chips mounted to flexible circuit substrates within each of the trays; and a controller configured to apply a power-sequencing scheme that supplies power to active flexible memory strands.

20 Claims, 4 Drawing Sheets

SOLID-STATE MASS DATA STORAGE DEVICE

This application claims the benefit of U.S. Provisional Application Ser. No. 61/298,481 filed Jan. 26, 2010, the contents of which are incorporated by reference herein.

TECHNICAL FIELD

The invention relates to data storage techniques.

BACKGROUND

Data storage media are commonly used for storage and retrieval of data, and come in many forms, such as magnetic tape, solid-state memory, magnetic disks, optical tape, optical disks, holographic disks, cards or tape, and the like. Devices using solid-state memory for mass data storage are becoming more prevalent. As an example, solid-state drives are used in place of hard disk drives in some laptop computers. Solid-state data storage devices are also commonly available as portable data storage devices, including Universal Serial Bus (USB) flash drives.

In some solid-state drives, data is stored on small integrated circuits called NAND chips. The data is non-volatile in nature, and remains intact even after power is removed. The NAND chips are small, typically fragile pieces of silicon, and attached to a printed circuit board (PCB) via electrical interconnects. To provide greater capacity, solid-state drives often include multiple NAND chips attached to a single PCB.

SUMMARY

The techniques disclosed herein may be useful to provide a solid-state data storage system with a petabyte capacity. Such a system is referred to herein as a Petabyte Solid-state Storage Unit (PSSU). As one example, a PSSU may be implemented as a field-deployable (and portable) solid-state data storage system. A PSSU may utilize solid-state memory chips mounted to flexible circuit substrates instead of PCBs. The flexible circuit substrates may be mounted within trays and a plurality of trays may be mounted within a single durable housing. The housing may also encase a power supply, a fan tray to provide cooling and a controller configured to provide input/output control of the PSSU and to actively manage power of the PSSU by limiting power to only flexible circuit substrates including solid-state memory chips actively used for reading or writing operations. A PSSU may also include a user interface such that the PSSU may function as a stand-alone device and does not require a host device for accessing or storing data.

In one example, a solid-state drive system comprises a housing forming an enclosure; a plurality of trays within the enclosure of the housing; a plurality of non-volatile, rewriteable solid-state memory chips mounted to flexible circuit substrates within each of the trays; and a controller configured to apply a power-sequencing scheme that supplies power to active flexible memory strands.

In another example, a solid-state data storage system comprises means for storing at least 500 terabytes of data in capacity per unit volume of at least 250 terabytes per cubic foot; means for actively managing power consumption of the means for storing at least 500 terabytes of data; and a housing forming an enclosure that contains the means for storing at least 500 terabytes of data and the means for actively managing power consumption.

The details of one or more examples are set forth in the accompanying drawings and the description below. Other features, objects, and advantages will be apparent from the description and drawings, and from the claims.

DETAILED DESCRIPTION

Storage of petabyte data sets is not uncommon in government or industry, relegated to the data center and housed in massive libraries involving thousands of magnetic data cartridges or equally large hard disk drive (HDD) Raid Arrays. While these systems are certainly adequate in terms of transfer rate and capacity, they are not suitable in terms of size, power requirements, and operating environment, when designing a field deployable system.

The features disclosed herein that facilitate a PSSU are a departure from the current flash drive designs, in consideration of the 4000× capacity over current technologies, and the environmental and operational specifications being addressed. With such massive amounts of data being consolidated in a relatively few cubic feet of space, it is important to consider combining proven and novel techniques of assembling solid-state devices. The solid-state data storage techniques disclosed herein offer a unique capabilities including high density recording capability, fast sustainable streaming rates, g-force durability, survivability, and low power consumption. Solid-state drives have proven themselves over the past few years in airliner black box recorders.

Figure 1:
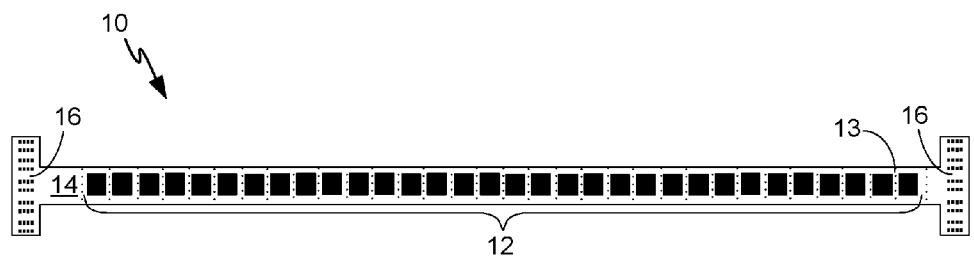
FIG. 1 is a conceptual illustration of a flexible memory strand including a row of solid-state memory chips mounted on a single flexible circuit substrate.

Flexible circuit substrates including a single row of solid-state memory chips are referred to as flexible memory strands. FIG. 1 is a conceptual illustration of flexible memory strand 10, which includes a row of thirty-two (32) solid-state memory chips 12 mounted on a single flexible circuit substrate 14. Flexible memory strand 10 further includes interconnects 16, which are located on either end of flexible memory strand 10.

In the example of flexible memory strand 10, a PSSU that utilizes these flexible substrates may reduce weight of the system by up to seventy-five (75) percent as compared to using thick PCBs. In an example, each flexible substrate strand, such as flexible memory strand 10, may include thirty-two (32) chips and provide about two to four (2-4) terabytes of data storage capacity. In different examples, a flexible substrate strand may comprises a relatively thin flexible substrate, such as flexible substrate having a thickness of 500 µm or less, such as a 125 µm thick flexible substrate. In contrast to PCBs, flexible substrates bend easily, which can reduce stresses applied to chips mounted on the flexible substrates as compared to chips mounted on a PCB experiencing a bending stress. As an example, a flexible substrate may allow a bend radius of less than 6 inches without fracturing and/or experiencing plastic deformation. In different examples, a flexible substrate may allow a bend radius of less than 4 inches, less than 3 inches, less than 2 inches less than 1 inches or even less than 0.5 inches without fracturing and/or experiencing plastic deformation. Flexible memory strand 10 further includes precut perforations, one of which is indicated by reference number 13, between adjacent memory chips 12 and flexible circuit substrate 14 to allow for controlled tear points to further minimize stresses to the NAND chips in the event of an impact to a PSSU including flexible memory strand 10.

In one example, a PSSU may utilize NAND chips electrically mounted on strands of flexible substrate, although NOR chips may also be used. Current flash memory systems utilize PCB assemblies to carry relatively small number of NAND memory chips. This is fine for small capacity drives, but for a Petabyte drive class system, the typical 1.25 mm PCB thickness poses a limit to efficient packing of the NAND devices within a common housing.

In one example, the flexible circuit substrates may include a single row of solid-state memory chips. As another example, solid-state memory chips may be mounted on both sides of a flexible circuit substrate. In yet another example, the flexible circuit substrates may each include two or more rows of solid-state memory chips to provide an array of solid-state memory chips on a single flexible circuit substrate.

Figure 2:
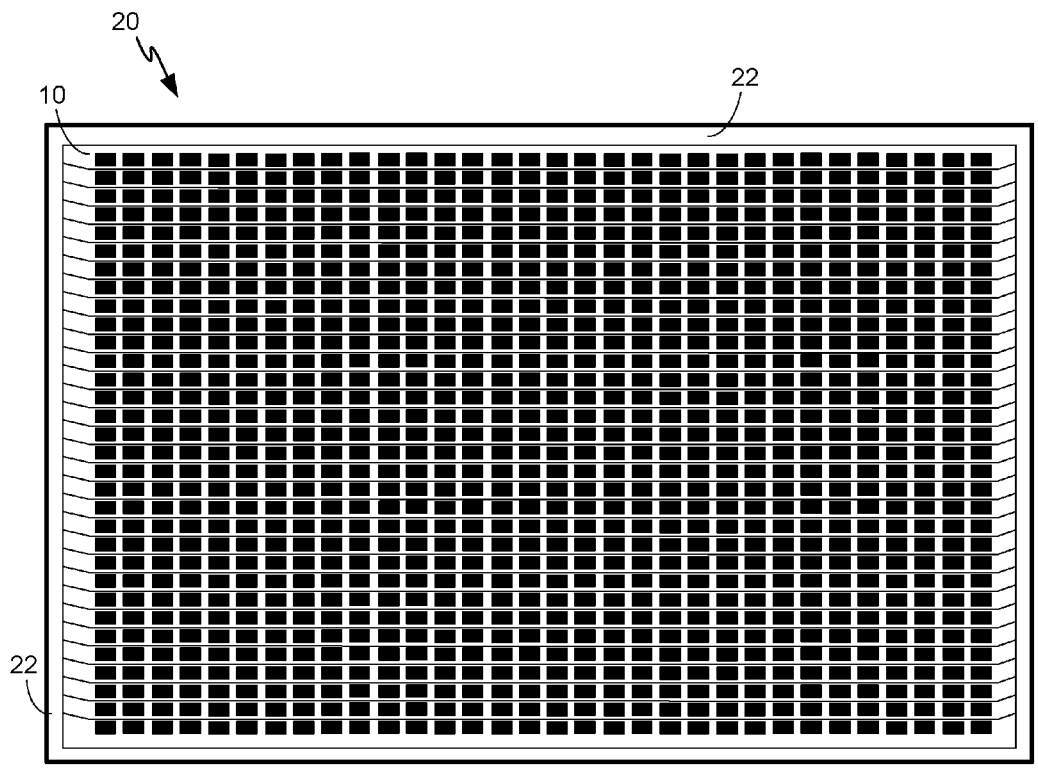
FIG. 2 is a conceptual illustration of a memory tray assembly including a frame securing an arrangement of flexible memory strands.

FIG. 2 is a conceptual illustration of memory tray assembly 20, which includes an arrangement of flexible memory strands 10 secured within a common frame 22. Frame 22 may provide for improved durability and more efficient air cooling as compared to PCB variants. Frame 22 also facilitates modularity of the PSSU. For example, memory tray assembly 20 may be replaceable within the PSSU and strands 10 may be replaceable within frame 22.

Memory tray assembly 20 includes thirty-two (32) strands of memory modules mounted to frame 22. Frame 22 includes connectors receive interconnects 16 of flexible memory strands 10. Frame 22 distributes power, data, and control signals to flexible memory strands 10. Frame 22 also serves as a mechanical support to flexible memory strands 10 suspended from the two sides of frame 22. The suspension serves to dampen g-shock, and provide a path for air movement through the system.

Figure 3A:
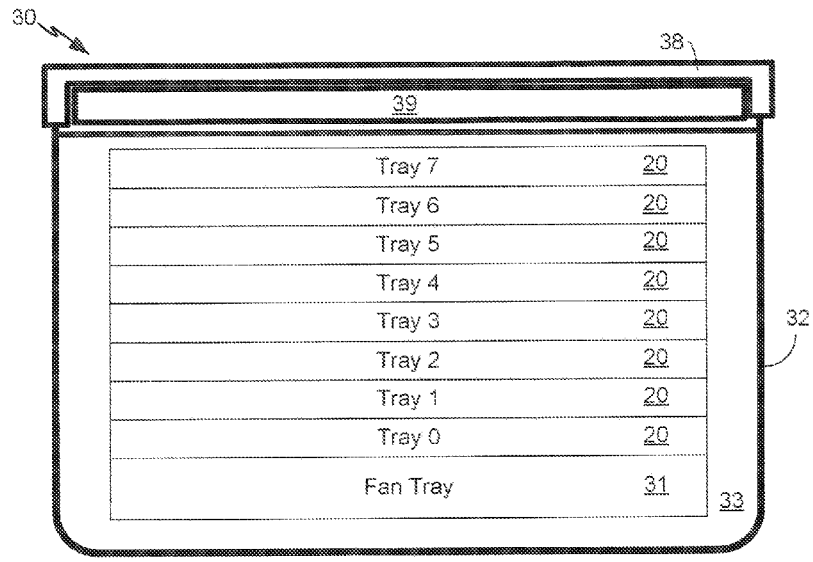
FIGS. 3A-3B are conceptual illustrations of PSSU that includes a plurality of trays mounted within a single durable housing.
Figure 3B:
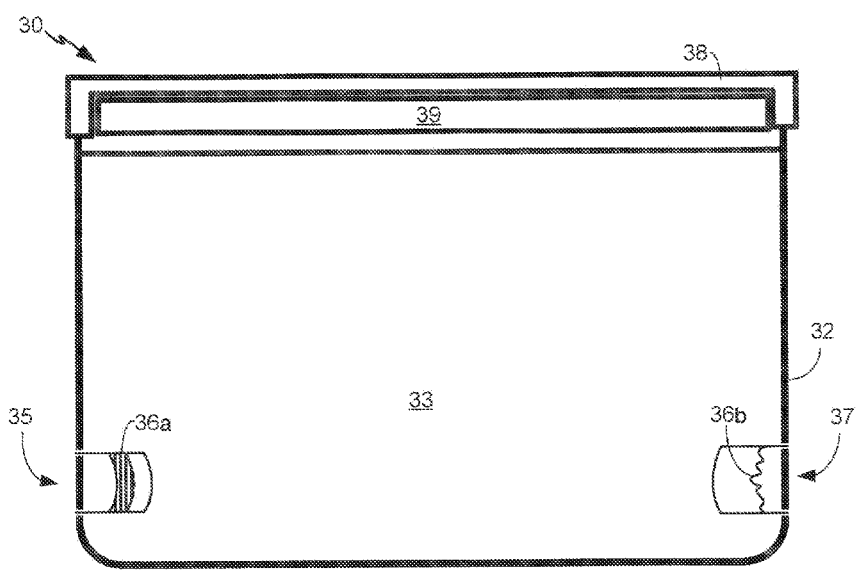

FIGS. 3A-3B are conceptual illustrations of PSSU 30, which includes plurality of trays 20 mounted within a single durable housing 32. PSSU 30 may include features as disclosed herein that facilitate the transfer of an entire Petabyte retrievable from PSSU 30 in a 24 hour time period. In addition, PSSU 30 may provide a small form factor, low power package that can be deployed in a military theatre of operation.

Bringing the techniques disclosed herein may facilitate a system, such as PSSU 30, providing one or more or even all of the following features:

1 Petabyte capacity
15-17 GB/sec transfer rate
256 Gb NAND chips on flexible substrate strands
32 strands of memory mounted in a frame
8 memory frames mounted in sealed environment
Sealed memory casing mounted in a ruggedized container
Built-in HDD for data indexing
Laboratory sealed recording environment
2 cu ft footprint
200 Watt power consumption, 28 VDC supply
30 lb weight
−40° C. to 85° C. operating environment As shown in FIG. 3A, housing 32 includes cover 38 and forms internal environment 33. Eight memory tray assemblies 20, numbered 0 through 7 in FIG. 3A, are within internal environment 33. Trays 20 are electrically interconnected to further expand the memory capacity of the system. Fully populating PSSU 30 with the eight (8) trays 20 may provide a capacity of 1 petabyte.

Because PSSU 30 may utilize NAND memory chips electrically mounted on strands of flexible substrate suspended between members of a frame, PSSU 30 has the potential to offer better cooling capacity to the NAND components than if they were mounted on a large flat PCBs sandwiched between neighboring boards. One or more fans mounted below the multiplicity of NAND carrying frames can move air up between the various strands unimpeded.

Additionally, housing 32 may further encase a power supply (not shown in FIGS. 3A-3B) and a controller (not shown in FIGS. 3A-3B) configured to provide input/output control of PSSU 30 and to actively manage power of PSSU 30 by limiting power to only flexible circuit substrates including solid-state memory chips actively used for reading or writing operations. Fan tray 31 is located within internal environment 33 to provide cooling and/or heating. Fan tray 31 is in the bottom position of housing 32 and can be utilized to push air up through trays 20 above it to keep the active flexible memory strands cool.

PSSU 30 further includes display 39, which serves as a user interface such that PSSU 30 may function as a stand-alone device and does not require a host device for accessing or storing data. The user interface may be configured to monitor the solid-state memory system as well as control data storage and access display 39 under cover 38, but not within internal environment 33 of housing 32. In one example, display 39 may accessible by opening cover 38. In other examples, PSSU 30 may not include cover 38, and display 39 may be readily accessible on the exterior of housing 32 and be exposed to an external environment.

In some examples, internal environment 33 of housing 32 may be a substantially sealed housing providing a substantially sealed internal environment. The substantially sealed housing may reduce or eliminate environmental contamination of PSSU 30 to improve reliability of PSSU 30 in less than ideal operating conditions.

In some examples, a substantially sealed housing may maintain a constant pressure. One feature that may be provided by a sealed housing is that it allows for the substantial elimination of contaminants that may impair electronic performance or cooling of the system. Limiting contaminants allows for higher reliability of PSSU 30.

However, it may not be necessary to pressurize housing 32 for PSSU 30. For example, the internal environment may be at an ambient pressure. In such examples, a filter may be located within an exterior wall of the housing in order to allow the internal environment within a substantially sealed housing to adjust to an ambient pressure without introducing contaminants within the housing. In yet another example, a substantially sealed housing may include a deformable portion such that the internal environment may maintain an ambient pressure without exchanging gases with the external environment. For example, a housing may include a rubber or foil bladder that deforms to substantially balance the internal pressure with the external pressure. In this way, pressure may change inside housing 32, but the gases within housing 32 may remain self-contained.

As represented in FIG. 3B, housing 32 may include one or more ports 35, 37 in exterior walls of the housing. For simplicity, memory tray assemblies 20 and fan tray 31 are not shown in FIG. 3B. Ports 35, 37 allow the substantially sealed internal environment of housing 32 to be at an ambient pressure. Port 35 includes filter 36a in order to allow the internal environment within housing 32 to adjust to an ambient pressure without introducing contaminants within housing 32. In contrast, port 37 includes deformable portion 36b such that internal environment 33 maintains ambient pressure without exchanging gases with an external environment. Deformable portion 36b may be a rubber or foil bladder that deforms to substantially balance the internal pressure with the external pressure. While both ports 35, 37 are shown in FIG. 3B, in practice a PSSU housing would not likely include a port with a filter and a port with a deformable portion. However a PSSU housing may include more than one port, e.g., to better facilitate cooling of the PSSU.

In one example, PSSU 30 is a stand-alone tape solid-state storage unit with multiple fiber interfaces to support sustained data transfer rates in excess of 15 Gigabyte/second for a 24 hour recording period. Total capacity for PSSU 30 may be 1 Petabyte (1E+15 bytes). The storage medium sealed within PSSU 30 may comprise a NAND memory system. The NAND memory may be mounted on flexible substrate strands electrically interconnected to frames. Individual strands or frames can be accessed or replaced by opening the drive unit in an electrostatically controlled clean room facility. PSSU 30 is a few cubic feet in size, and is designed, by its sealed nature, to withstand the harshest of environments. In some examples, PSSU 30 may run off a low voltage DC supply to allow battery operation.

In one example, PSSU 30 relies on the incorporating design aspects of field proven technology and integrating such field proven technology with substantially advanced storage memory, controllers, fiber interfaces, and electronic technologies.

Figure 4:
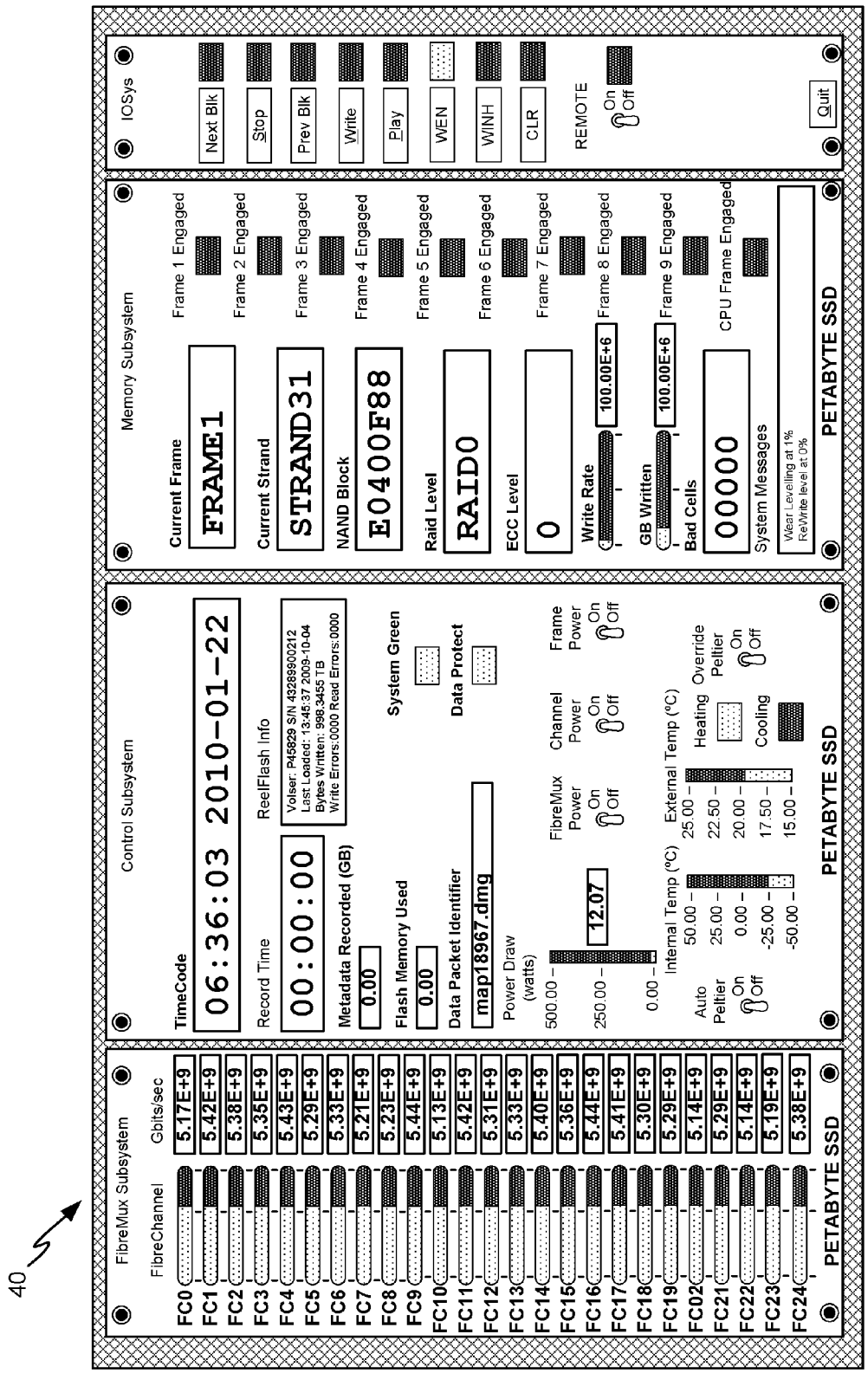
FIG. 4 is a conceptual illustration of an exemplary graphical user interface for a PSSU.

In some examples, PSSU 30 may contain a graphical user interface for real time monitoring the data flow, capacity, recording time, and health of PSSU 30. The graphical user interface may comprise an embedded ruggedized LCD with touch screen capability, such as display 29. In one example, the touch screen may be integrated in an exterior surface of the housing forming an enclosure for the solid-state memory chips of the PSSU. This is a differentiation from other solid-state memory devices which rely on a host to monitor the status of the device. FIG. 4 is a conceptual illustration of an exemplary graphical user interface 40 for PSSU 30 suitable for use on a touch-screen.

Figure 5:
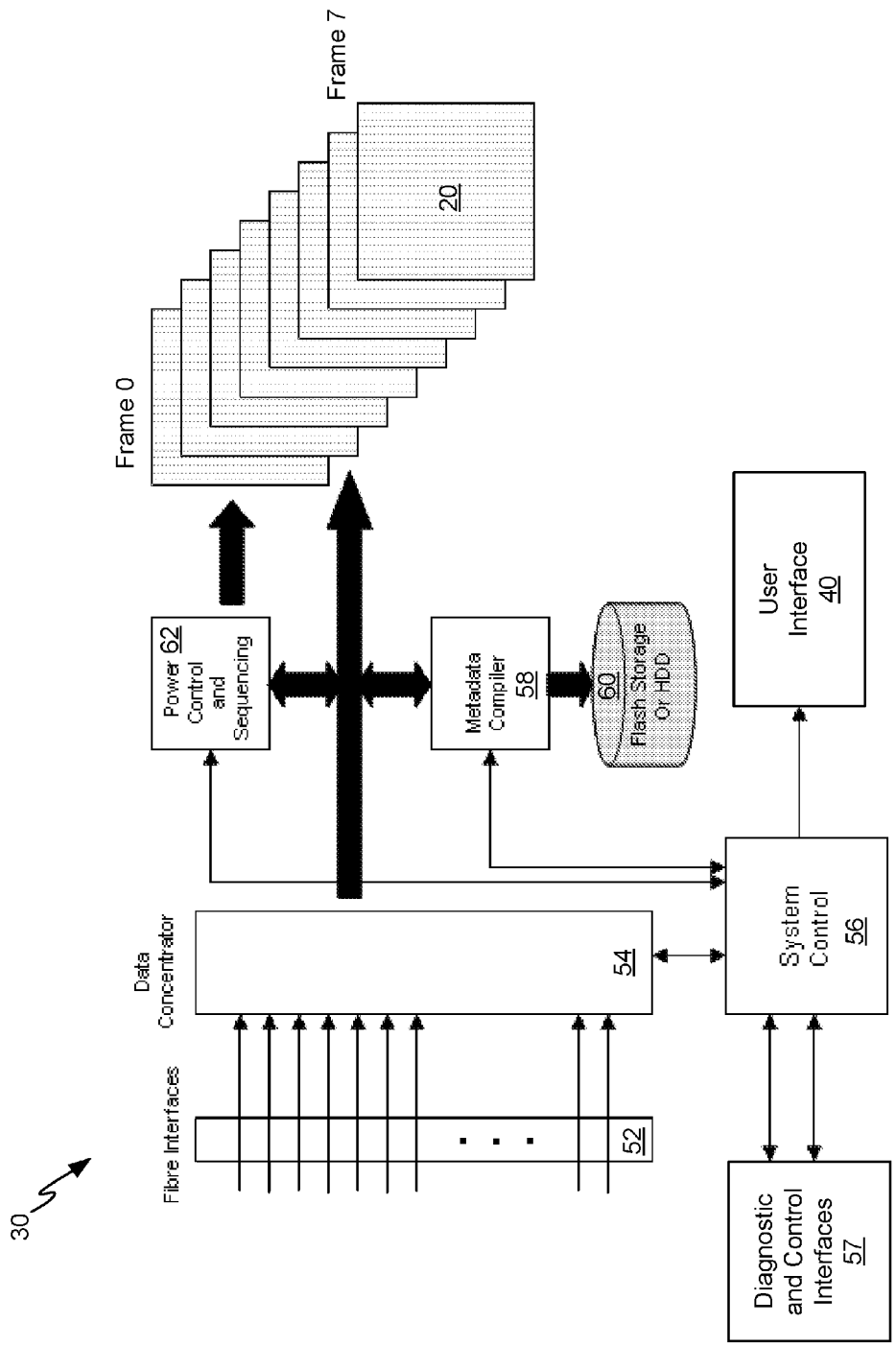
FIG. 5 is a conceptual block diagram of a PSSU.

FIG. 5 is a conceptual block diagram of PSSU 30. As shown in FIG. 5, multiple fiber interfaces 52 may be provided to stream data into PSSU 30 via data concentrator 54. PSSU 30 may include control interface 56 to deliver drive control information to and from PSSU 30, such as Begin Record, Stop Record, Play, and Seek Data commands from user interface 40. In an example, user interface 40 may conform to the exemplary graphical user interface shown in FIG. 4.

A separate metadata USB/FIREWIRE interface 58 (or an interface conforming to another format or standard) may be provided to allow read/write access to an integrated hard disk device 60. A diagnostic interface 57 may be provided to monitor PSSU 30 health, internal temperature, and memory life. Power control and sequencing module 62 may be provided to manage power of frames 20, e.g., by serving as a controller configured to apply a power-sequencing scheme that supplies power to active flexible memory strands and limits or ceases power to some or all of the inactive memory strands.

In some examples, multiple fiber interfaces 52 may leverage Fiber Channel such as FPDP VITA-17.2, although any suitable interface can be selected according. As an example, four 6.4 GB fibers may be used to facilitate data transfer at 2.553 GB/sec to PSSU 30. Another example may bond additional fibers, such as 24 fibers, to achieve a 15.3 GB/sec transfer rate from the sensor inputs. Eight Virtex-5 FPGA's may be used to achieve this interface, each handling 4 fiber connections. Each Virtex-5 can have 512 MB of DDR3 memory to facilitate buffering of incoming data. In this example, such a high speed interface may require about 120 watts of the overall power budget for PSSU 30.

In one example, power control and sequencing module 62 may provide for power-sequencing techniques to reduce overall power consumption of PSSU 30. For example, a PSSU 30 including 8192 NAND chips in standby mode may consume about 819 watts of power. Reducing power consumed by PSSU 30 also reduces cooling requirements for PSSU 30. Power-sequencing may occur for each of the memory strands. In essence, as data streams into a powered-up memory strand, the system may anticipate the eventual filling of that memory strand, and initiate power-up of the next memory strand. When streaming gates over to the next memory strand, the controller may initiate power down of the previous memory strand. Sequencing may continue down through the memory strands across the frame, and on to the next frame. Only a select number of memory strands may be powered at any given time to support the data transfer requirements of the system.

In some examples, PSSU 30 may include a built in flash drive or hard drive module, such as hard disk device 60, built into the system to record a duplicate copy of the directory information and meta data indexes stored in flash. The format and data to be stored may be end user defined, but may allow for the rapid track location ID of data so that access times can be minimized. Contents of the memory can also be recalled without performing a full search or indexing of the memory. Hard disk device 60 can be removed with the memory system in the clean room by opening the PSSU enclosure.

Within PSSU 30, frames 20 may provide memory chips defining a net data storage capacity of at least 500 terabytes, such as a net data storage capacity of at least 1 petabyte. PSSU 30 may define a capacity per unit volume of at least 100 terabytes per cubic foot, a capacity per unit volume of at least 250 terabytes per cubic foot, or even a capacity per unit volume of at least 500 terabytes per cubic foot. In different examples, PSSU 30 may define a volume of no greater than about 4 cubic feet, and even define a volume of no greater than about 2 cubic feet.

In an example, all encryption, and formatting may be performed external to PSSU 30. For example, by performing encryption, decryption and formatting functions outside the system, sensitive data stored on PSSU 30 may be more secure than if such functions were performed by PSSU 30. In other examples, encryption, decryption and formatting functions may be performed by PSSU 30 itself.

In different examples, different data formats may be used. Generally, the data format passed to PSSU 30 in byte form across the fiber data interfaces. Deformatting may be performed on external hardware connected to PSSU 30. In such examples, operational power consumption of PSSU 30 is reduced, which also limits heat buildup inside PSSU 30. In other examples, PSSU 30 may include hardware for deformatting.

The disclosed examples may provide one or more advantages. For example, a PSSU including flexible circuits may provide improved durability relative to a PCB variation. PCBs defining a size that is large enough to carry an array of 32×32 NAND chips are not very flexible, nor are they good at protecting the components on them in the event of a projectile hitting the board. The rigidity of the board, coupled with the structure of 100's of chips soldered down to its surface, provides a very conductive path for any shock occurring to the board. Likely, a projectile hitting the PCB can induce a lot of collateral damage to neighboring chips and in this case, the probably of massive, unrecoverable data loss is high.

In contrast, a PSSU system designed around flexible substrates supporting NAND chips lessens the likelihood of data loss in response to shock. In this case, any shock to the system is damped by the flexible substrate before it can damage the NAND chips or their solder connections to the substrate. Likewise, a projectile entering the system will likely tear the strands, and may take out a few chips, but may not endanger many neighboring chips in the system. A torn substrate can be more easily rewired to a controller than unsoldered NAND chips, and a torn substrate may be much easier to repair than a multilevel PCB. In some examples a flexible substrate may include precut perforations between chips to allow for controlled tear points in the strands to further minimize stresses to the NAND chips. Additionally, flexible circuit substrate, as described herein for a PSSU, offers some advantages in harsh environments as the flex circuits may be covered with a polyimide layer. In contrast, PCB's have an overcoat, but exposed traces and pads are open to corrosion.

When building large arrays of memory assemblies, there is little tolerance for suspect individual memory chip performance, either created through soldering processes, flex bonding, ESD failure modes or both. For this reason, a PSSU may be assembled in a clean room. In addition, memory installation or replacement for the PSSU may require removal of the PSSU cover in an electrostatically monitored clean room.

The techniques described in this disclosure may be implemented, at least in part, in hardware, software, firmware or any combination thereof. For example, various examples of the techniques may be implemented within one or more microprocessors, digital signal processors (DSPs), application specific integrated circuits (ASICs), field programmable gate arrays (FPGAs), or any other equivalent integrated or discrete logic circuitry, as well as any combinations of such components, embodied in programmers, such as physician or patient programmers, stimulators, or other devices. The term "interface," "controller" or "module" may generally refer to any of the foregoing logic circuitry, alone or in combination with other logic circuitry, or any other equivalent circuitry.

When implemented in software, various functionality ascribed to the systems and devices described in this disclosure may be embodied as instructions on a computer-readable storage medium such as random access memory (RAM), read-only memory (ROM), non-volatile random access memory (NVRAM), electrically erasable programmable read-only memory (EEPROM), FLASH memory, magnetic media, optical media, or the like. The instructions may be executed to cause one or more processors to support one or more examples of the functionality described in this disclosure.

Various examples of this disclosure have been described. However, various modifications to the described examples may be made within the spirit of this disclosure. For example, the described examples generally refer to a solid-state data storage system with a petabyte capacity. Nonetheless, the actual data storage capacity of a PSSU system is not a requirement of the invention, and the features described herein may provide advantages in solid-state systems having more or less data storage capacity.

As another example, solid-state memory is generally described as being implemented using NAND chips. However, other solid-state memory chip may also be used. As one example NOR chips are also a solid-state memory suitable. Another example of a suitable solid-state memory is magnetoresistive random access memory (MRAM). MRAM stores data in oriented magnetic fields and reads the data based on changes in electrical resistance.

These and other examples are within the scope of the following claims.

The invention claimed is:

1. A solid-state data storage system comprising:
a housing forming an enclosure, the housing providing a substantially sealed internal environment;
a plurality of trays stacked within the enclosure of the housing, each tray having a frame comprising a plurality of connectors correspondingly receiving interconnects of a plurality of flexible circuit substrates, each flexible circuit substrate having a top surface and a bottom surface, wherein the plurality of flexible circuit substrates are suspended from the frame such that there is air space at the top and bottom surfaces of the flexible circuit substrates;
a plurality of non-volatile, rewriteable solid-state memory chips mounted to each flexible circuit substrate on at least one of the top and bottom surfaces thereof; and
a controller configured to apply a power-sequencing scheme that supplies power to active flexible memory strands.

2. The solid-state data storage system of claim 1, wherein the plurality of flexible circuit substrates within each of the trays comprises a plurality of flexible substrate strips, wherein each flexible substrate strip includes a set of the memory chips arranged in a row.

3. The solid-state data storage system of claim 1, wherein the power-sequencing scheme applies power to only a small number of flexible memory strands as necessary to perform data storage or data access operations.

4. The solid-state data storage system of claim 1, further comprising:
memory controllers within the enclosure;
a metadata hard drive within the enclosure; and
dynamic ram buffers within the enclosure.

5. The solid-state data storage system of claim 1, further comprising a housing frame within the housing, wherein the plurality of trays is stacked within the housing frame.

6. The solid-state data storage system of claim 1, wherein the memory chips define a net data storage capacity of at least 500 terabytes.

7. The solid-state data storage system of claim 1, wherein the memory chips define a net data storage capacity of at least 1 petabyte.

8. The solid-state data storage system of claim 7, wherein the solid-state data storage system defines a volume of no greater than about 4 cubic feet.

9. The solid-state data storage system of claim 7, wherein the solid-state data storage system defines a volume of no greater than about 2 cubic feet.

10. The solid-state data storage system of claim 1, further comprising a flash memory or hard disk within the housing, wherein the flash memory or hard disk is configured to store directory information for data stored on the solid-state memory system.

11. The solid-state data storage system of claim 1, wherein the substantially sealed internal environment within the housing is at an ambient pressure.

12. The solid-state data storage system of claim 1, further comprising a filter within an exterior wall of the housing in order to allow the internal environment within the housing to adjust to an ambient pressure without introducing contaminants within the housing.

13. The solid-state data storage system of claim 1, wherein the substantially sealed housing includes a deformable portion such that the internal environment maintains ambient pressure without exchanging gases with an external environment.

14. The solid-state data storage system of claim 1, further comprising a user interface configured to monitoring data flow, capacity, recording time, and health of the solid-state data storage system.

15. The solid-state data storage system of claim 14, wherein the user interface is a graphical user interface.

16. The solid-state data storage system of claim 15, wherein the user interface includes an LCD with touch screen capability integrated with an exterior surface of the housing.

17. The solid-state data storage system of claim 1, wherein the memory chips comprise at least one of a group comprising: NAND chips; MRAM chips; NOR chips; and flash memory chips.

18. The solid-state data storage system of claim 1, wherein the flexible circuit substrates have perforations between adjacent memory chips.

19. A solid-state data storage system comprising:
   means for storing at least 500 terabytes of data in capacity per unit volume of at least 250 terabytes per cubic foot, the means comprising a plurality of stacked trays, each having a frame comprising a plurality of connectors correspondingly receiving interconnects of a plurality of flexible circuit substrates, each flexible circuit substrate having a top surface and a bottom surface, wherein the plurality of flexible circuit substrates are suspended from the frame such that there is air space at the top and bottom surfaces of the flexible circuit substrates, the means further comprising a plurality of non-volatile, rewriteable solid-state memory chips mounted to each flexible circuit substrate on at least one of the top and bottom surfaces thereof;
   means for actively managing power consumption of the means for storing at least 500 terabytes of data; and
   a housing forming an enclosure that contains the means for storing at least 500 terabytes of data and the means for actively managing power consumption, the housing providing a substantially sealed internal environment.

20. The solid-state data storage system of claim 19, further comprising a user interface configured to monitoring data flow, capacity, recording time, and health of the solid-state data storage system.

* * * * *